US010325086B2

(12) United States Patent
Riddiford

(10) Patent No.: US 10,325,086 B2
(45) Date of Patent: *Jun. 18, 2019

(54) COMPUTING DEVICE WITH GRAPHICAL AUTHENTICATION INTERFACE

(75) Inventor: Martin Philip Riddiford, Dulwich (GB)

(73) Assignee: BlackBerry Limited, Waterloo, Ontario (CA)

( * ) Notice: Subject to any disclaimer, the term of this patent is extended or adjusted under 35 U.S.C. 154(b) by 1089 days.

This patent is subject to a terminal disclaimer.

(21) Appl. No.: 13/379,337

(22) PCT Filed: Jun. 15, 2010

(86) PCT No.: PCT/GB2010/001172
§ 371 (c)(1),
(2), (4) Date: Mar. 13, 2012

(87) PCT Pub. No.: WO2010/146352
PCT Pub. Date: Dec. 23, 2010

(65) Prior Publication Data
US 2012/0167199 A1    Jun. 28, 2012

(30) Foreign Application Priority Data

Jun. 18, 2009 (GB) .................................. 0910545.3
Jul. 10, 2009 (GB) .................................. 0912008.0

(51) Int. Cl.
*G06F 21/36* (2013.01)
*G06K 9/62* (2006.01)
(Continued)

(52) U.S. Cl.
CPC ............. *G06F 21/36* (2013.01); *G06F 3/0481* (2013.01); *G06F 3/04842* (2013.01); *G06K 9/6211* (2013.01)

(58) Field of Classification Search
CPC ........ G06F 21/31; G06F 21/36; G06F 3/0481; G06F 3/04842; G06K 9/6211
See application file for complete search history.

(56) References Cited

U.S. PATENT DOCUMENTS 5,559,961 A *  9/1996  Blonder .......................... 726/18
5,699,514 A   12/1997  Durinovic-Johri et al.
(Continued)

FOREIGN PATENT DOCUMENTS

CN        1547688      11/2004
CN      101282217      10/2008
(Continued)

OTHER PUBLICATIONS

Martin Mihajlov et al., "ImagePass—Designing Graphical Authentication for Security", 2011 IEEE, pp. 262-267.*
(Continued)

*Primary Examiner* — Luu T Pham
*Assistant Examiner* — Canh Le
(74) *Attorney, Agent, or Firm* — Fish & Richardson P.C.

(57) ABSTRACT

A computing device with a graphical authentication interface in which the device displays a base image and authenticates a user when a pre-selected element in a secondary image overlying the base image is aligned with a pre-selected element in the base image.

61 Claims, 5 Drawing Sheets

(51) Int. Cl.
*G06F 3/0481* (2013.01)
*G06F 3/0484* (2013.01)

(56) References Cited

U.S. PATENT DOCUMENTS

| | | | |
|---|---|---|---|
| 5,821,933 A * | 10/1998 | Keller | G06F 3/04817 715/741 |
| 6,118,872 A | 9/2000 | Kashima et al. | |
| 6,209,104 B1 | 3/2001 | Jalili | |
| 6,327,659 B2 | 12/2001 | Boroditsky | |
| 6,686,931 B1 | 2/2004 | Bodnar | |
| 6,862,687 B1 | 3/2005 | Suzuki | |
| 6,950,949 B1 | 9/2005 | Gilchrist | |
| 7,124,433 B2 | 10/2006 | Little | |
| 7,240,367 B2 | 7/2007 | Park | |
| 7,376,899 B2 | 5/2008 | Mantyla | |
| 7,453,443 B2 | 11/2008 | Rytivaara et al. | |
| 7,659,869 B1 | 2/2010 | Bauchot et al. | |
| 7,720,307 B2 | 5/2010 | Iizuka | |
| RE41,922 E | 11/2010 | Gough et al. | |
| 7,992,202 B2 * | 8/2011 | Won et al. | 726/19 |
| 8,111,134 B2 | 2/2012 | Faith et al. | |
| 8,229,250 B2 | 7/2012 | Suzuki et al. | |
| 8,458,485 B2 | 6/2013 | Bandyopadhyay et al. | |
| 8,483,518 B2 | 7/2013 | Zhu et al. | |
| 2002/0029341 A1 * | 3/2002 | Juels et al. | 713/184 |
| 2003/0193512 A1 | 10/2003 | Komagata | |
| 2004/0004616 A1 | 1/2004 | Konya et al. | |
| 2004/0010721 A1 * | 1/2004 | Kirovski et al. | 713/202 |
| 2004/0010722 A1 | 1/2004 | Ha | |
| 2004/0030933 A1 * | 2/2004 | Park | 713/202 |
| 2005/0201638 A1 | 9/2005 | Cha | |
| 2005/0246138 A1 | 11/2005 | Park | |
| 2005/0251752 A1 | 11/2005 | Tan et al. | |
| 2006/0206717 A1 * | 9/2006 | Holt et al. | 713/182 |
| 2006/0206919 A1 | 9/2006 | Montgomery et al. | |
| 2006/0238517 A1 | 10/2006 | King et al. | |
| 2007/0150842 A1 | 6/2007 | Chaudhri et al. | |
| 2007/0250934 A1 * | 10/2007 | Park | 726/26 |
| 2007/0277224 A1 * | 11/2007 | Osborn | G06F 21/36 726/2 |
| 2008/0060052 A1 * | 3/2008 | Hwang | G06F 21/31 726/2 |
| 2008/0092245 A1 | 4/2008 | Alward et al. | |
| 2008/0113791 A1 | 5/2008 | Williams et al. | |
| 2008/0127302 A1 | 5/2008 | Qvarfordt et al. | |
| 2008/0165153 A1 | 7/2008 | Platzer et al. | |
| 2008/0201578 A1 * | 8/2008 | Drake | 713/172 |
| 2008/0209223 A1 | 8/2008 | Nandy et al. | |
| 2008/0244700 A1 * | 10/2008 | Osborn et al. | 726/2 |
| 2009/0012880 A1 | 1/2009 | Tortola | |
| 2009/0037986 A1 | 2/2009 | Baker | |
| 2009/0038006 A1 | 2/2009 | Traenkenschuh et al. | |
| 2009/0046856 A1 | 2/2009 | Mitchell | |
| 2009/0046929 A1 | 2/2009 | De Leon | |
| 2009/0077653 A1 | 3/2009 | Osborn et al. | |
| 2009/0138723 A1 | 5/2009 | Nyang et al. | |
| 2009/0160800 A1 | 6/2009 | Liu et al. | |
| 2009/0172810 A1 * | 7/2009 | Won | G06F 21/36 726/19 |
| 2009/0187986 A1 | 7/2009 | Ozeki | |
| 2009/0293119 A1 | 11/2009 | Jonsson | |
| 2009/0300732 A1 | 12/2009 | Hwang et al. | |
| 2009/0313693 A1 | 12/2009 | Rogers | |
| 2009/0320124 A1 * | 12/2009 | Taxier et al. | 726/17 |
| 2009/0328175 A1 | 12/2009 | Shuster | |
| 2010/0037313 A1 | 2/2010 | Tomeny | |
| 2010/0040293 A1 | 2/2010 | Hermann et al. | |
| 2010/0043062 A1 * | 2/2010 | Alexander et al. | 726/6 |
| 2010/0050242 A1 * | 2/2010 | Delia et al. | 726/6 |
| 2010/0058437 A1 * | 3/2010 | Liew | G06F 21/36 726/2 |
| 2010/0064376 A1 | 3/2010 | Vladimirovitch et al. | |
| 2010/0102941 A1 | 4/2010 | Richter et al. | |
| 2010/0107067 A1 | 4/2010 | Vaisanen | |
| 2010/0169958 A1 * | 7/2010 | Werner | G06F 21/36 726/6 |
| 2010/0180336 A1 * | 7/2010 | Jones et al. | 726/19 |
| 2010/0205667 A1 | 8/2010 | Anderson et al. | |
| 2010/0287382 A1 | 11/2010 | Gyorffy et al. | |
| 2010/0322485 A1 | 12/2010 | Riddiford | |
| 2010/0333198 A1 | 12/2010 | Mikake | |
| 2011/0096997 A1 * | 4/2011 | Marciszko et al. | 382/218 |
| 2011/0202982 A1 | 8/2011 | Alexander et al. | |
| 2011/0289576 A1 | 11/2011 | Cheng | |
| 2012/0011564 A1 | 1/2012 | Osborn et al. | |
| 2012/0023574 A1 | 1/2012 | Osborn et al. | |
| 2012/0159593 A1 | 6/2012 | Griffin et al. | |
| 2012/0159608 A1 | 6/2012 | Griffin et al. | |
| 2012/0159613 A1 | 6/2012 | Griffin et al. | |
| 2012/0159614 A1 | 6/2012 | Griffin et al. | |
| 2012/0159615 A1 | 6/2012 | Griffin et al. | |
| 2012/0159616 A1 | 6/2012 | Griffin et al. | |
| 2012/0167199 A1 | 6/2012 | Riddiford | |
| 2012/0291120 A1 | 11/2012 | Griffin | |

FOREIGN PATENT DOCUMENTS

| | | |
|---|---|---|
| CN | 102804195 | 11/2012 |
| EP | 0677801 | 10/1995 |
| EP | 901060 | 3/1999 |
| EP | 1422589 A1 | 5/2004 |
| EP | 1845474 A1 | 10/2007 |
| EP | 2000939 A2 | 12/2008 |
| EP | 2254071 A1 | 11/2010 |
| JP | 2001092785 A | 4/2001 |
| TW | I268690 | 12/2006 |
| WO | 0198924 A1 | 12/2001 |
| WO | 0199338 A1 | 12/2001 |
| WO | 03048909 A2 | 6/2003 |
| WO | 2004027632 A1 | 4/2004 |
| WO | 2005029216 A2 | 3/2005 |
| WO | 2006073313 A1 | 7/2006 |
| WO | 2007098569 A1 | 9/2007 |
| WO | 2008124708 | 10/2008 |
| WO | 2008124708 A2 | 10/2008 |
| WO | 2008132724 | 11/2008 |
| WO | 2009022242 | 2/2009 |
| WO | 2009150655 A1 | 12/2009 |

OTHER PUBLICATIONS

Ahish Joshi et al., "A more Multifactor Secure Authentication Scheme based on graphical authentication", 2012 IEEE, pp. 186-18.*

Office Action dated Sep. 4, 2013, in corresponding Canadian patent application No. 2,760,826.

Office Action dated Sep. 4, 2013, in corresponding Canadian patent application No. 2,760,337.

International Search Report and Written Opinion dated Sep. 15, 2010, in corresponding PCT patent application No. PCT/GB2010/001172.

International Search Report and Written Opinion dated Sep. 16, 2010, in corresponding PCT patent application No. PCT/GB2010/001173.

Non-Final Office Action dated Oct. 11, 2012, in corresponding U.S. Appl. No. 12/815,763.

Hoanca et al.; Screen oriented technique for reducing the incidence of shoulder surfing; Proceedings of International Conference of Security of Information and Networks; 2005; Citeseer; pp. 1-7.

Non-Final Office Action dated Nov. 20, 2012, in corresponding U.S. Appl. No. 12/969,647; 11 pages.

Non-Final Office Action dated Oct. 3, 2012, in corresponding U.S. Appl. No. 12/969,646; 16 pages.

Non-Final Office Action dated Oct. 10, 2012, in corresponding U.S. Appl. No. 12/969,797; 17 pages.

Non-Final Office Action dated Sep. 4, 2012, in corresponding U.S. Appl. No. 12/969,645; 29 pages.

Non-Final Office Action dated Aug. 14, 2012, in corresponding U.S. Appl. No. 12/969,640; 18 pages.

(56) References Cited

OTHER PUBLICATIONS

Notice of Allowance dated Nov. 9, 2012, in corresponding U.S. Appl. No. 12/969,638; 15 pages.
Non-Final Office Action dated Aug. 27, 2012, in corresponding U.S. Appl. No. 12/969,633; 17 pages.
Examination Report dated Feb. 2, 2012, in corresponding Great Britain Patent Application No. GB0912008.0; 7 pages.
Examination Report dated Aug. 2, 2012, in corresponding Great Britain Patent Application No. GB0912008.0; 7 pages.
Non-Final Office Action dated Oct. 11, 2012, in corresponding U.S. Appl. No. 12/815,763; 15 pages.
Non-Final Office Action dated Dec. 12, 2012, in corresponding U.S. Appl. No. 12/969,637; 11 pages.
Office Action dated Nov. 12, 2013, in Canadian patent application No. 2,775,859.
Office Action dated Jun. 20, 2013, in corresponding Taiwan patent application No. 099119542.
English translation of Office Action dated Jun. 20, 2013, in corresponding Taiwan patent application No. 099119542.
Office Action issued in corresponding UK Application No. GB0912008.0 dated Feb. 2, 2012; 4 pages.
Sobrado, Leonardo and Birget, Jean-Camille, "Shoulder-Surfing resistant graphical passwords—Draft" New Jersey, USA; Apr. 11, 2005 pp. 1-8.
Kim, David et al., Multi-Touch Authentication on Tabletops at http//homepages.cs.ncl.ac.uk/david.kim/multi-touch_authentication;online; retrieved Mar. 10, 2011, 6 pages.
Tan et al., Spy-Resistant keyboard: More Secure Password Entry on Public Touch Screen Displays; Microsoft Research; published 2005; 10 pages.
Sobrado, L. et al., "Graphical Passwords", 2002, The Rutgers Scholar: An Electronic Bulletin of Undergraduate Research; http://rutgersscholar.rutgers.edu/volume04/sobrbirg/sobrbirg.htm; vol. 4, pp. 1-10; published 2002 and retrieved on Mar. 19, 2013.
English abstract for JP2001092785; published on Apr. 6, 2001 and retrieved on Sep. 6, 2011.
Office Action dated Mar. 5, 2014 in Canadian patent application No. 2,760,826.
Non-Final Office Action dated Mar. 28, 2014 in U.S. Appl. No. 12/969,640.
Office Action dated Mar. 31, 2014 in Canadian patent application No. 2,760,337.
Gossweiler et al., "What's up CAPTCHA? A CAPTCHA Based on Image Orientation", Proceedings of the 18th International Conference on World Wide Web, Apr. 20, 2009, pp. 841-850, ACM, New york, NY, USA.
Feng et al., "Recognition of head-and-shoulder face image using virtual frontal-view image", IEEE Transactions on Systems, Man, and Cybernetics, Part A:Systems and Humans, vol. 30, No. 6, pp. 871-883, Nov. 2000.
Al-Baker et al., "A GPRS-based remote human face identification system for handheld devices", Second IFIP International Conference on Wireless and Optical Communications Networks, pp. 367-371, Mar. 6-8, 2005.
Final Office Action dated Apr. 9, 2014 in U.S. Appl. No. 12/815,763.
Office Action issued in U.S. Appl. No. 12/969,640 dated Jan. 16, 2015; 14 pages.
Office Action dated Jul. 2, 2014; in Chinese patent application No. 201080036587.1.
English translation of the Office Action dated Jul. 2, 2014; in Chinese patent application No. 201080036587.1.
Office Action dated Jun. 30, 2014; in Chinese patent application No. 201080036589.0.
English translation of the Office Action dated Jun. 30, 2014; in Chinese patent application No. 201080036589.0.
English abstract for CN1547688; published on Nov. 17, 2004 and retrieved on Oct. 16, 2014.
English abstract for CN101282217; published on Oct. 8, 2008 and retrieved on Oct. 16, 2014.
English abstract for CN102804195; published on Nov. 28, 2012 and retrieved on Oct. 16, 2014.
Communication Pursuant to Article 94(3) EPC issued in EP Application No. 10728857.3 dated Feb. 23, 2017; 5 pages.
Communication Pursuant to Article 94(3) EPC issued in EP Application No. 10732724.9 dated Feb. 23, 2017; 5 pages.
Office Action issued in CA Application No. 2,765,922 dated Aug. 18, 2015; 6 pages.
Office Action issued in CA Application No. 2,765,922 dated Nov. 21, 2016; 4 pages.
Office Action issued in CA Application No. 2,766,019 dated Aug. 3, 2017; 4 pages.
Office Action issued in CA Application No. 2,765,922 dated Oct. 25, 2017; 6 pages.
Office Action issued in U.S. Appl. No. 14/712,013 dated Nov. 2, 2017; 19 pages.
Advisory Action issued in U.S. Appl. No. 14/712,013 dated Sep. 6, 2017; 3 pages.
Notice of Allowance issued in U.S. Appl. No. 14/712,013 dated Sep. 6, 2018; 5 pages.
Office Action issued in CA Application No. 2,765,922 dated Oct. 12, 2018; 4 pages.
Notice of Allowance issued in CA Application No. 2,766,019 dated Jun. 22, 2018; 1 page.
Summons to Attend Oral Proceedings Pursuant to Rule 115(1) EPC issued in 10728857.3-1213 dated Jul. 18, 2018; 17 pages.
Summons to Attend Oral Proceedings Pursuant to Rule 115(1) EPC issued in 10732724.9-1213 dated Jul. 18, 2018; 17 pages.

* cited by examiner

COMPUTING DEVICE WITH GRAPHICAL AUTHENTICATION INTERFACE

CROSS-REFERENCE TO RELATED APPLICATIONS

This application claims the benefit of priority of prior Patent Application No. GB0910545.3, filed Jun. 18, 2009 in the United Kingdom Intellectual Property Office, and Patent Application No. GB0912008.0, filed Jul. 10, 2009 in the United Kingdom Intellectual Property Office, the entire contents of both applications are incorporated herein by reference.

FIELD

This disclosure relates to a computing device with a graphical authentication interface.

BACKGROUND

Although most computing devices (particularly personal computing devices) have built in password security, many people choose not to have the hassle of initiating it. Those that do are often frustrated by it, and often there is a corporate insistence on changing the password every month. Every log-in ideally needs a different password. Remembering all those passwords and selecting the appropriate one is very onerous.

In practice password systems for computing devices can be breached in several ways, for example: random trial and error, e.g., hitting random keys, where eventually the correct password will be found, but may take a long time; systematic trial and error, e.g., trying 0000, 0001, 0002, and so forth for a PIN number; inspired guesswork, e.g., trying general favorite numbers, for example, 1066, 1234, and so forth, or personal numbers, for example, birthday, telephone number, and so forth; learning the password by surveillance, shoulder surfing, finding the password written down somewhere, and so forth; hacking, e.g., key click measurement, on-line interception, and so forth; forced disclosure to a mugger.

A 4 number PIN has a theoretical security of 1 in 10×10×10×10=1 in 10,000 or 0.0001. Hackers would probably give up if they had the typical three chances at these odds. However in practice the problem is that people find it hard to remember multiple passwords/numbers, so either they choose a memorable personal number which is likely to be used widely elsewhere, or a non-memorable one which they need to write down somewhere—usually next to the computing device requiring the security. Finally there have been many reported instances of surveillance scams to learn passwords, or just looking over someone's shoulder when they are entering their PIN or password. So the practical security offered by a PIN number, say (from a hacker's or thieves point of view) is in fact quite modest.

SUMMARY

A computing device with a graphical authentication interface in which the device displays a base image and authenticates a user when a pre-selected element in a secondary image overlying the base image is aligned with a pre-selected element in the base image.

DETAILED DESCRIPTION

Figure 1:
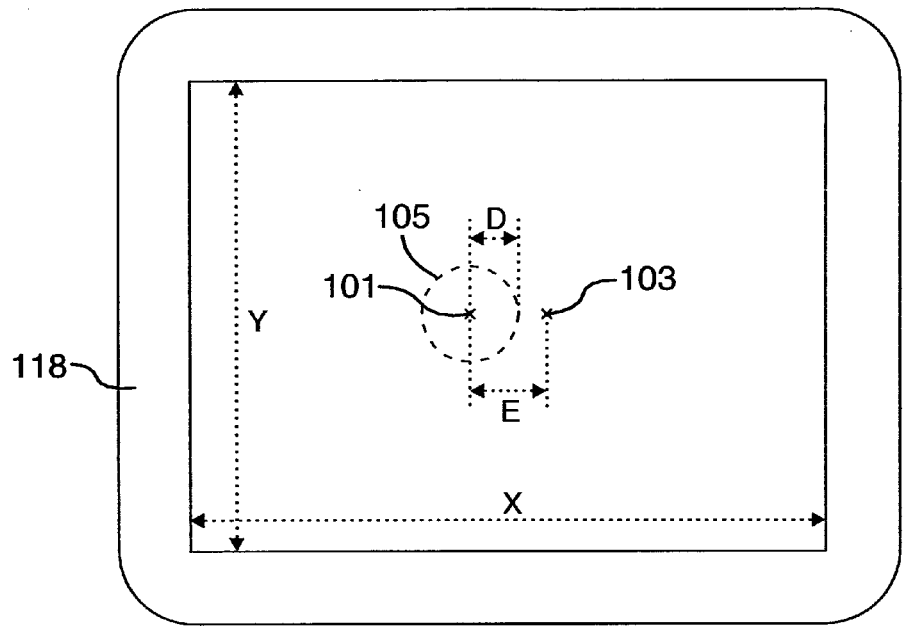
FIG. 1 shows an unsuccessful graphical authentication in accordance with the disclosure.

A computing device with a graphical authentication interface in which the device displays a base image and a user, in order to authenticate, aligns a pre-selected element present in a secondary image layer overlying the base image, with a pre-selected element in the base image.

The method exploits our high degree of visual acuity and memory. We can all remember thousands of faces, many hundreds of images and countless views. It is this natural capacity for easily memorising even minute visual details that is utilised in this method; it requires, in one implementation, a user to memorise an exact spot on a familiar image and to be able to memorise another visual element and align that element over the spot. The user experience is far better than conventional PIN or password based systems. It is also more secure, especially against someone watching you authenticate using this system. Also, users also cannot write down an image or part of an image for others to see or steal, unlike PIN codes or passwords.

The method will be described with reference to an implementation called Clixel. Clixel is based on a simple analogue alignment task performed on a portable, personal computing device with a colour screen and a 2 dimensional cursor control or other way of (a) selecting a location on an image and (b) moving an image. (In the future this may take place in a 3D virtual environment, and hence require a 3 dimensional controller, but the current Clixel implementation uses a 2D cursor control.)

The computing device screen displays a base layer image, usually fixed in a static position. Although Clixel uses a static base image layer, the ability to move this could increase security. For example, the computing device could automatically re-size/re-position the base image layer slightly each new time it is displayed to further prevent copying.

This base image layer is the equivalent to the desktop background picture, probably imported from the user's photos library. A personal picture will be more memorable to the user than a generic sample. A busy, detailed picture works best; software running on the computing device could analyse a picture for busy-ness and score for suitability.

When setting up the authentication process, the user identifies a memorable point of interest in this base image (we will refer to this as a 'Safe Point') and positions a pointer over it using a mouse or similar and clicks to confirm and set up the target on this layer. Other navigation devices that can be used include a trackpad, ISO point, trackball, touchscreen, tilt/gesture/shake control, cursor keys etc. In some simple touch screen computing devices, such as navigation systems, there is no cursor as such; instead a user simply selects the point of interest by touching it.

The size of the adjustable target is inversely proportional to the level of security. Once confirmed, the pointer disappears, and the invisible target is activated. A secondary layer now appears and overlays the base layer. Clixel uses 2 layers with x and y cursors controlling the position of each layer, or a simple touch-to-drag the secondary layer approach. Multiple layers (e.g., 3 or more) are also possible for even greater number of permutations and hence security.

This secondary (it may be the top layer) may be transparent or translucent except for an array of user identifiable elements arranged in a regular pattern or grid. The elements could be numbers, letters words, colours, shapes, lines, icons etc., or any combination of these. (Note that the minimum that is needed for Clixel to work is a cursor for the top layer. This would have a theoretically high level of security if no one was watching, but in practice this is a poor solution as it is so easy to copy.)

When the cursor/mouse is moved, the whole grid array in the secondary image layer moves over the static base picture. In a touch screen device without a cursor, then the user can simply draw or flick his finger across the touch screen to cause the grid to move over the static base picture. Physics-based modelling can be used so that the speed of touch flick varies the distance the grid moves. Shake or tip control can be used in a computing device with accelerometer(s); a small tip could cause the grid to appear to start sliding over the base image. The grid is repeated or looped in all directions so that there is no edge to it. This means that the selected element is repeated too.

The task in the set-up phase is to align a preselected identifiable element present in the top layer with the selected point of interest (or Safe Point) in the base layer, and typically to then click to confirm.

The smaller the grid size, the higher is the number of elements in the second or top layer; the more elements there are, the greater the security, but the harder it is for a user to quickly and easily locate a specific element. Where clicking is inconvenient, say with a touchscreen, a timed dwell could be used as a confirmation. There would however need to be software to prevent 'mine-sweeping'—scanning back and forth slowly enough to trip the timed dwell.

This set-up procedure can be performed directly on the computing device that requires an authentication mechanism—once the set-up is complete, then the user will need to authenticate himself when accessing the computing device (or specific functions/levels of access offered by the computing device). So, for example, a user of a PC or mobile telephone could complete the above set-up procedure on that PC or mobile telephone. In addition, the user could complete the above set-up procedure on one computing device, and that could be applied to multiple other devices, so the user has merely to go through the set-up once, and then all computing devices to which he may need access share the same authentication process. This is particularly appropriate for authentication required by organisations with multiple computing devices, or for cloud computing applications, for point of sale authentication (e.g., at cash machines and when making purchases using credit or debit cards to replace conventional Chip and PIN systems).

When a user needs to authenticate himself to a computing device (e.g., whenever the device has been unused for more than a pre-selected time; the same circumstances in which a conventional PIN or password entry would be required), then the device displays the base image. The secondary image layer can then be called up. This can be done in a variety of ways. For a PC, the secondary image layer may appear automatically once the user touches any key on the keyboard or moves the mouse. For a touch screen device, a single touch to the screen could call up the secondary image layer. For a handheld device like a mobile telephone, a short shake (or any of the preceding actions) could call up the secondary image layer. Once the secondary image layer is displayed, the user has to move the elements in that secondary image layer so that the pre-selected element in that secondary image layer sufficiently aligns over the pre-selected point of interest. Because the elements in the secondary image layer are formed into a linked grid of elements, moving one element causes all the rest to move in a predictable manner. So the user does not have to select the pre-selected element and move that—instead, any element can be selected (e.g., the user can place his cursor or simply touch anywhere in the secondary image layer) and then moved until there is a sufficient alignment between the pre-selected element in the secondary image layer and the point of interest in the base layer. But an observer looking over the shoulder of the user will have no idea as to which element the user is aligning, and which region of the base image is the target.

A display 118 of width X and height Y for a computing device 100 is shown in FIG. 1. The pre-selected point of interest 101 of the base image and the position of the pre-selected element 103 of the secondary image are shown. A successful authentication, e.g., log-in attempt, occurs when the pre-selected element in the secondary image sufficiently aligns over the pre-selected point of interest. In the example of FIG. 1, a circle, having radius D, centered on the point of interest 101 is the authentication area 105 in which a successful authentication results for a position of the pre-selected element. In this example, D is the maximum distance from point of interest to element location for a successful authentication, such as a log-in. E is the distance from the point of interest 101 to the position of the pre-selected element 103 of the secondary image. Because distance E is greater than the distance D, authentication is not successful in this example.

In FIG. 1, the authentication is not successful because the alignment between the selected element in the top layer and the point of interest or Safe Point in the base layer is insufficiently accurate. Note that the authentication area 105 can be changed by modifying the value of D. This alters the percentage of the overall screen area (X*Y) that would result in a successful log in attempt. If D is smaller, the position of the element of the secondary image 103 is more accurately aligned to the point of interest 101 to successfully log in. If D is larger, the position of the element of the secondary image 103 can be less accurately aligned to the point of interest 101 to successfully log in. In practice, a vendor of a computing device will through careful testing establish optimal parameter values for a given screen resolution and size, and a given cursor mechanism. The user may also be given the ability to select the effective size of the region associated with a point of interest (i.e., distance D).

Figure 2:
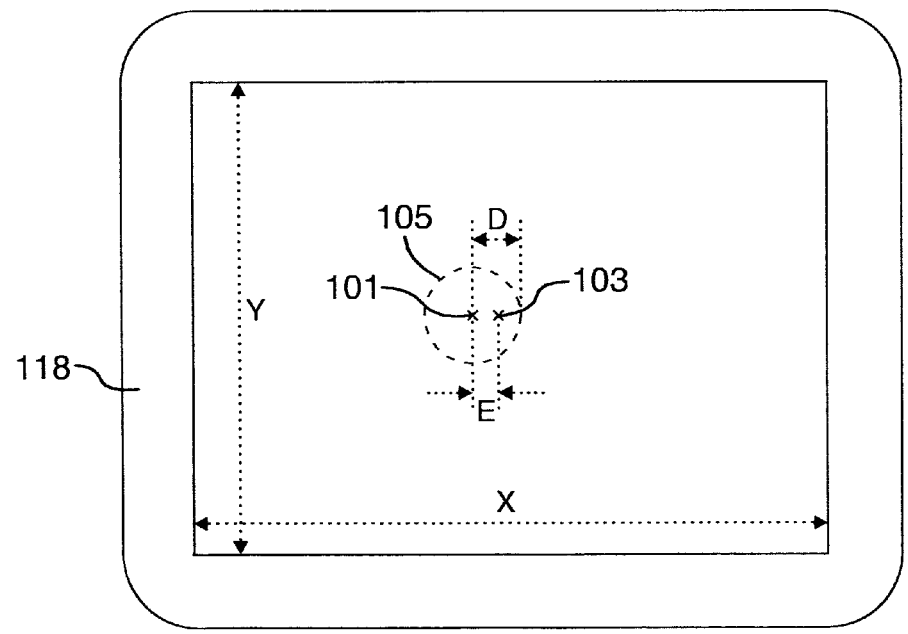
FIG. 2 shows a successful graphical authentication in accordance with the disclosure.

FIG. 2 shows a successful alignment, leading to authentication and hence access to the computing device (or confirmation of a sale if the device is a point of sale terminal, etc.).

The following reviews the method as described above against the 6 ways of breaching a standard password or PIN.

Random trial and error, systematic trial and error—The security level is the target area divided by the screen area. A 2 mm target on a laptop screen gives about the same level of security as a 4 digit PIN number. If greater security is required, then two or more targets can be used with clicks in sequence. With two targets, security for each stage halves due to the area of the two targets, but the 2 stage operation multiplies the odds, hence this increases theoretically to about 1 in 25 million for the laptop example. Over the shoulder security will be different depending whether the two targets are on the base layer or top layer. However two targets on the base layer and one target on the top layer is likely to be the quickest to use. Further security can be added by tracking the move between both clicks—the vector/gesture/timing can be analysed as a signature.

Inspired guesswork—Analysis of the base picture might determine that there are say 100 possible points of interest, and areas of no detail hence locally no points of interest. If there are 100 elements in the grid array, then the security is 1 in 1000. However as this is an analogue system, in reality there is likely to be many more than 100 target positions, as the user might target the edge of something, or the boundary between things etc.

Learning the password by surveillance—If it is desired to protect against someone looking over your shoulder, then Clixel can be adapted to excel in this area. As described above, the grid array always appears the same, so anyone can look at the relationship between a fixed point on the base layer, say the bottom left hand corner, and the nearest element to it on the top layer, and repeat that action. But if the layout of the grid array is changed every time it appears, then this will not work. The changes could be to the pitch of the grid, the orientation or skew of the grid, the order of the elements in the grid, the shape of the grid etc, or any combination of these, giving potentially hundreds of randomly selected variations on the array. These changes would be designed to be subtle and appear similar to the user so as not to confuse.

As there are two simple, personal entities to remember— the point of interest on the base layer and the identifiable element on the top layer—it should be easier to remember, and therefore there will be less reason to write it down. Because both layers act as prompts there is no chance of choosing the wrong password for the wrong log-in. Even a written down reminder is likely to carry a level of ambiguity—(i.e., "55 and the corner of Anne's mouth"). Knowledge of only one of these entities reduces the level of security in the above example to about 1 in 100—still a worthwhile hindrance.

Hacking—the use of the analogue mouse/trackball/touchscreen to enter the password prevents the use of hacking programs such as key stroke grabbers and other such technology being capable of intercepting the user's login details. While the mouse could indeed be tracked, due to the random generation of numbers in the grid tracking the trajectory of the mouse would not elicit the user's password.

On-line security is further enhanced through use of the combination of hexadecimal information available from both layers for use as the authentication key. Rather than using a simple set of numbers, i.e., the pixel point on the screen and x, y co-ordinate of the picture (although this is indeed an option), the system can merge the binary information from the top grid layer with the base picture layer which is used to render the picture, resulting in a byte code sequence many hundreds of times longer than an average user password. This byte code sequence, rather than a set of letters or numbers, can then be used to authenticate the user against the server system. Due to the length of the sequence this would therefore be far harder to interpret or hack than an average user entered password.

The information for rendering the separate layers, e.g., the top level grid and the bottom level picture, can also potentially reside in different areas, e.g., the user's picture can be secured and rendered from information within their credit card or mobile phone, while the specific elements required to generate the particular grid for that user can be held on a server system, or generated by the ATM. This segregation of the key elements required to generate the authentication key adds a further level of security by preventing third party access to both elements simultaneously, at least without the item containing the user's original image.

Forced disclosure to a mugger. Clixel offers a bold victim the chance to mislead a mugger by describing a false alignment while logging-in. Later, when this is tried again, it will not work because of the random grid change.

A factor for the security and usability of the system is the appearance of the top layer array. There is a trade off between the ease of locating your chosen identifiable element and the number of elements. This is compounded by the requirement to randomly modify the array. Finding your chosen element (say the number 55 in a grid of 10×10 grid of 100 numbers) is made easier by arranging the numbers in sequence. This works well for elements with well known sequences, like numbers and letters.

Another benefit of Clixel is that it can be graphically tailored to suit different users or their preferences. For example the top layer of a child's Clixel might consist of a selection of coloured shapes. In order to make it easy to find the selected element, the two variables (colour and shape) can be arranged horizontally and vertically, say, so the green triangle is always at the intersection of the green line and the triangle line. Three variables would give a hexagon like grid. To prevent copying the order of the colours and shapes can change every time it appears, as can the pitch/orientation/skew, etc., as before.

Having a range of base layer images/targets enable the user to have a number of easy to remember logins for different areas of their life—work/home, mobile phone, laptop, on line banking, on line transactions etc. These could all have the same top layer element, or could have different arrays of elements where required. Seeing a picture of the family overlaid with an array of coloured shapes is a visual prompt that you should be lining up the green triangle with Anne's mouth.

In most scenarios it is envisioned that if the first attempt to log-in is denied, then at least one more is allowed. It may be more convenient to use exactly the same grid array in the last position it was set to start the next attempt, rather than randomly set a new array. This will make it much faster for a user who has been careless with the target alignment. If access is denied again then you are locked out. There are many different known ways to override the lock out, depending on the equipment or service that is protected. It is envisaged that the first lock out will be 'soft', so that some functionality remains, giving the user/thief/hacker/finder appropriate options to rectify the situation.

A way of increasing the security is to simply have more login screens, i.e., a multiplication of the login process described. After successfully passing the first login screen (a base image/identifier pair) the user is presented with a second screen (base image/identifier pair) and so on until the required number of login stages has been achieved. This is especially important when dealing with smaller screens where the smaller screen size has a negative effect on the maximum security level that can be achieved for a single log in screen (base image/identifier pair).

Figure 3:
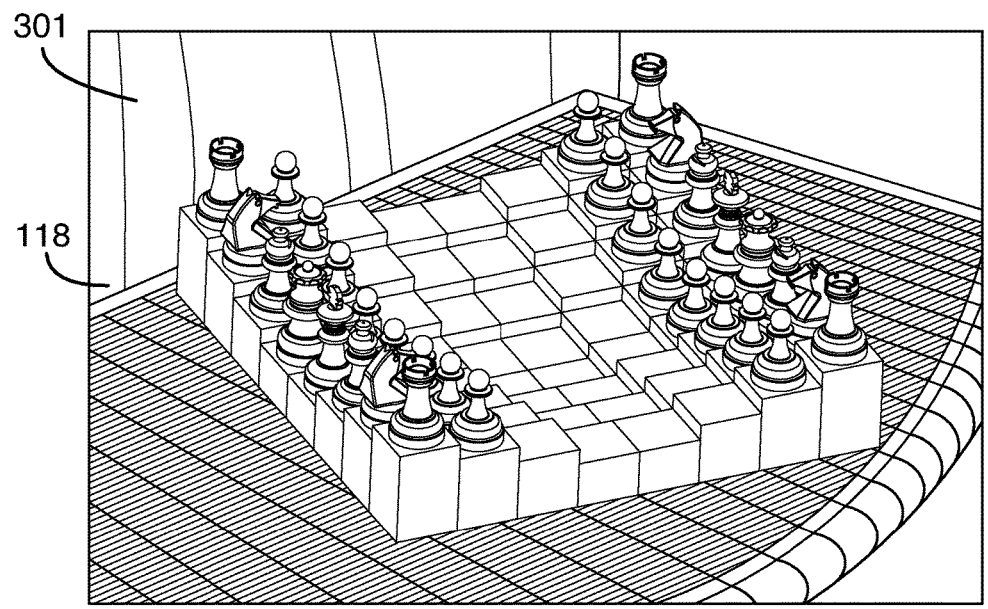
FIG. 3 shows a base image for graphical authentication in accordance with the disclosure.
Figure 4:
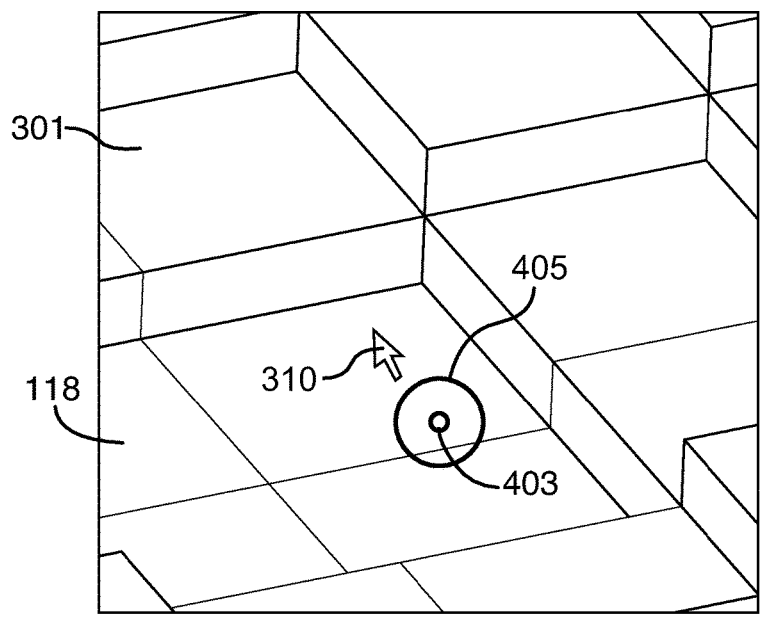
FIG. 4 shows a point of interest in the base image and associated circular authentication area during graphical authentication set-up in accordance with the disclosure.

This multiplication of log in screens allows for a quick initial access with a lesser level of security (e.g., a single login base image/identifier pair for unlocking a device) and a greater level of security for accessing certain areas of a device that require greater security (banking, email access etc.) or be enforced in an enterprise environment to ensure an adequate level of security. An example would be where only a single login screen is required to unlock a device and access certain functions, like making a call or browsing the web, but to make a payment or access company emails would require a user to pass three login screens before being granted access. Multiplying the screens provides a convenient mechanism for maintaining the flow of the login process but extending the security level by enforcing more login screens as required. The order in which subsequent screens appear could be randomised. An implementation will be described with reference to the accompanying FIG. 3 through FIG. 10. To set up Clixel, a user first chooses any personal image (generally a photograph) as their base image 301 in FIG. 3. This becomes the user's desktop or home screen that appears by default each time the user wishes to start a work session or gain access to the system by entering their name or simply switching the device on.

Choosing a point of interest 101 (we will refer to this as a 'Safe Point'): By pressing a pre-determined key on a keyboard, clicking on a screen button with the cursor 310 of a mouse or other pointing device, or by using a touchscreen the user activates the Safe Point cursor 405, shown in FIG. 4 in its default central position.

Figure 5:
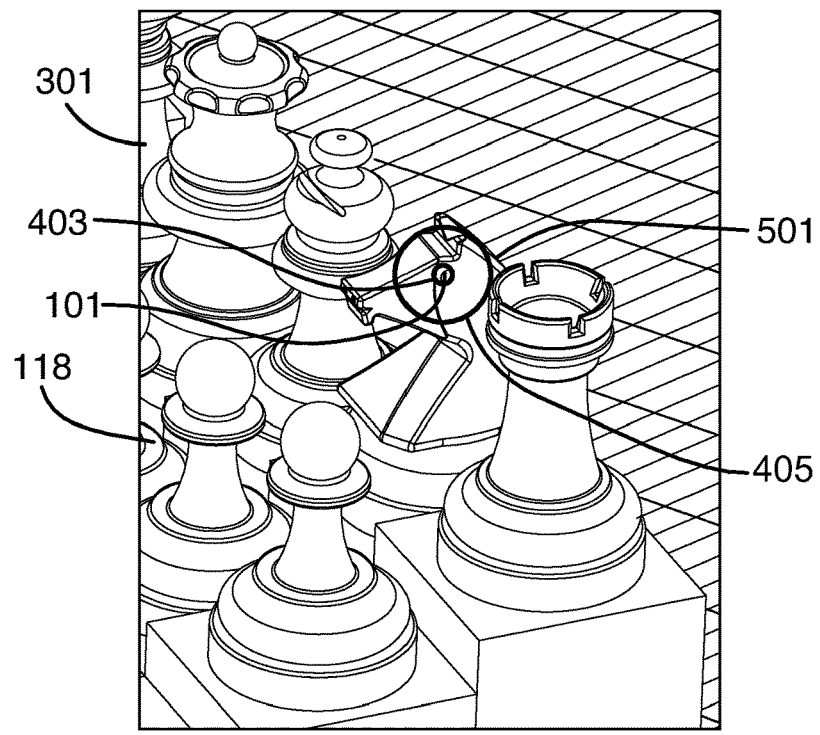
FIG. 5 shows selection of the point of interest during graphical authentication set-up in accordance with the disclosure.

The user is now prompted to select a position 403 for their personal Safe Point 101 anywhere on the Base Image 301, in this case the eye of the white knight chess piece 501, as shown in FIG. 5.

The Safe Point cursor 405 can be adjusted in size to suit different screen resolutions, sizes and desired security level—the smaller the size of the Safe Point 101 the more secure the method becomes.

Figure 6:
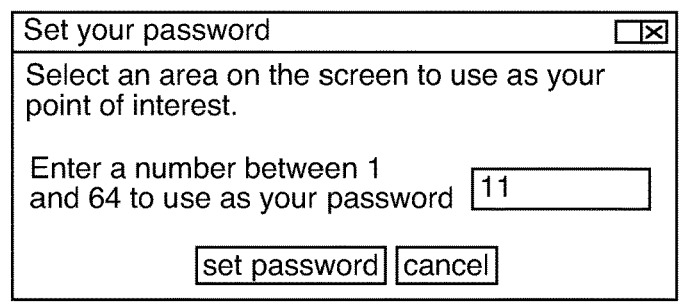
FIG. 6 shows selection of an element for a secondary image in the form of a number in accordance with the disclosure.
Figure 7:
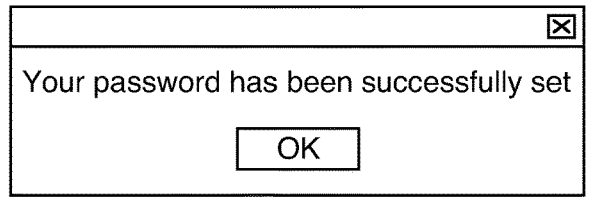
FIG. 7 shows a confirmation screen illustrating successful authentication set-up in accordance with the disclosure.

Setting a Password: The user is now prompted to select a Password, in this case a single number between 1 and 64, equally it could be any form of alphanumerical sequence in this implementation. A typical window is shown in FIG. 6. In this case the user has chosen the number 11. This prompts a confirmation screen, shown in FIG. 7.

Figure 8:
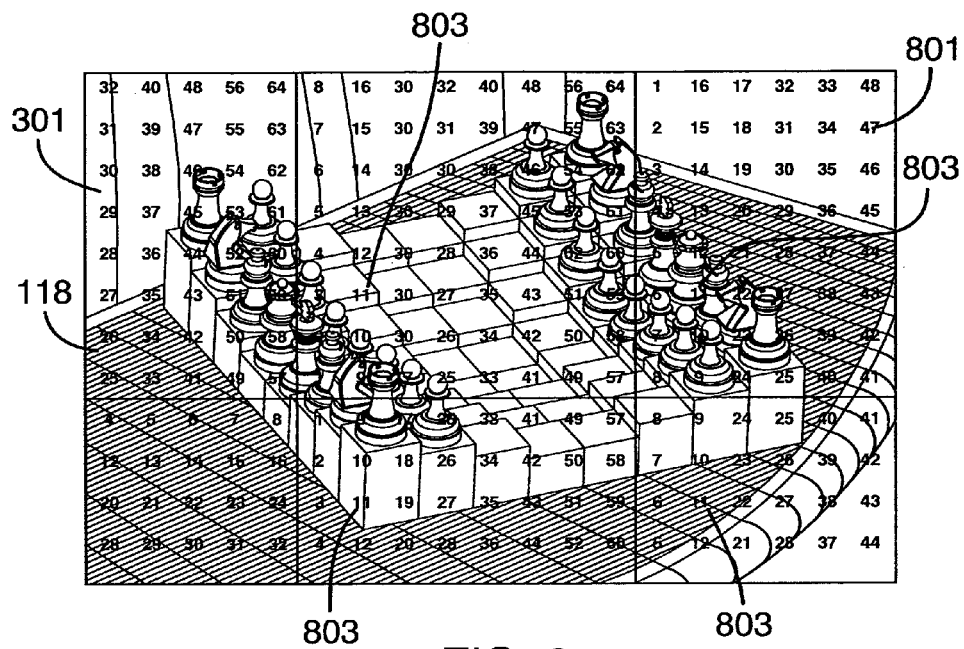
FIG. 8 shows the base image overlaid by the secondary image in accordance with the disclosure.
Figures 9, 10:
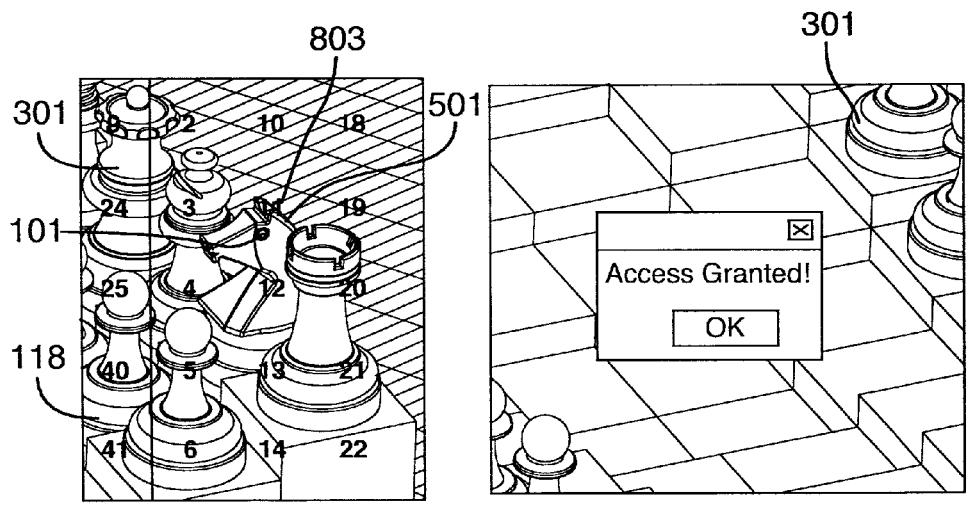
FIG. 9 shows authentication by aligning an element of the secondary image with the point of interest of the base image in accordance with the disclosure.
FIG. 10 shows a screen confirming successful authentication in accordance with the disclosure.

What the user does to log-in: when the user wishes to log-in or otherwise authenticate, they may, e.g., click on the Clixel logo and Safe Point selector appears overlaid on the Base Image 301, as shown in FIG. 8. In the example illustrated here the Safe Point selector is a repeating series of grids 801, each grid containing randomly generated alphanumeric characters—here nine grids each displaying numerals between 1 and 64 in a variation of sequences. The grids can be moved by the user to any part of the base image to line up the memorised Safe Point 803 with the chosen password, as shown in FIG. 9. When the user has lined up their chosen password 803 on the Safe Point 101, they press enter and if the positioning is correct Clixel permits them to log-in, as shown in FIG. 10.

Figure 11:
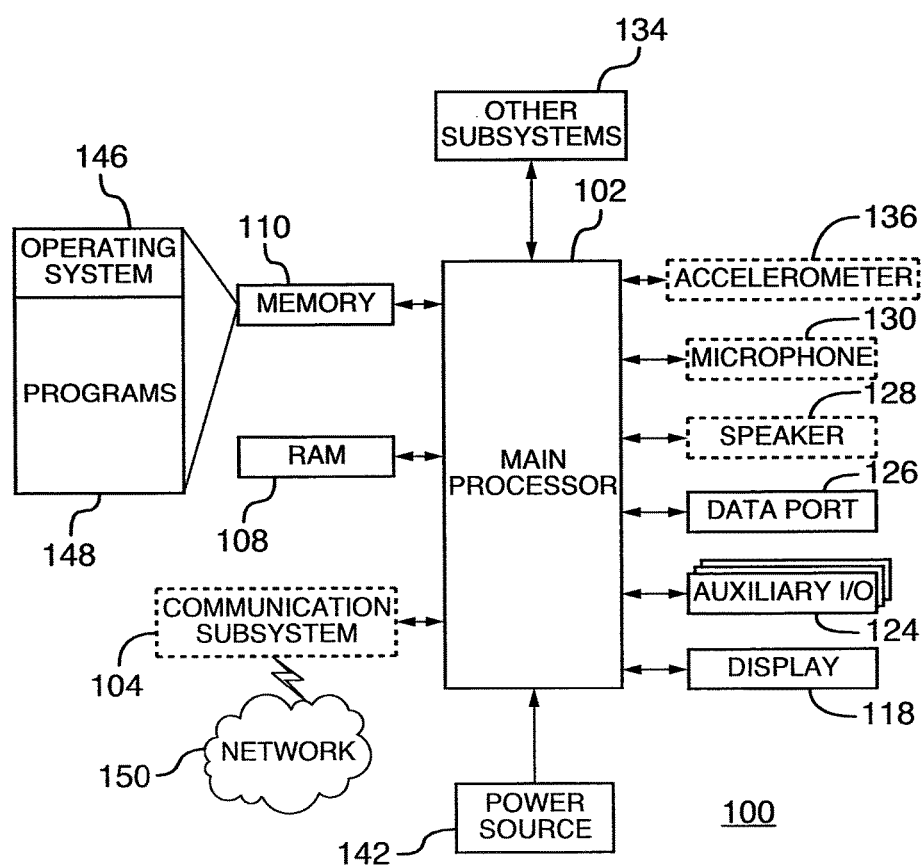
FIG. 11 shows a block diagram of a computing device in accordance with the disclosure.

A block diagram of an example of a computing device 100, which is shown as a portable electronic device in this example, is shown in FIG. 11. The computing device 100 includes multiple components, such as a processor 102 that controls the overall operation of the computing device 100. Communication functions, including data and voice communications, are performed through a communication subsystem 104 that communicates with a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the computing device 100.

The processor 102 interacts with other components, such as Random Access Memory (RAM) 108, memory 110, a display 118, which may optionally be a touch-sensitive display comprising a touch-sensitive overlay operably coupled to an electronic controller, one or more auxiliary input/output (I/O) subsystems 124 including, e.g., navigation devices, a data port 126, a speaker 128, a microphone 130, and other device subsystems 134 known in the art. Information, such as text, characters, symbols, images, icons, and other items that may be displayed or rendered on the computing device 100, is displayed on the display 118 via the processor 102. The processor 102 may interact with an accelerometer 136 that may be utilized to detect direction of gravitational forces or gravity-induced reaction forces. User identification information may be stored in memory 110. The computing device 100 includes an operating system 146 and software programs or components 148 that are executed by the processor 102 and are typically stored in a persistent, updatable store such as the memory 110. Additional applications or programs may be loaded onto the computing device 100 through the wireless network 150, the auxiliary I/O subsystem 124, the data port 126, or any other suitable subsystem 134.

Clixel is designed as a personal log-in or authentication method for any electronic device or system that has a digital display such as personal computers, personal information managers, cellular telephones, automated teller machines, security access systems, and so forth.

Extensions to the basic system. The above implementation involves the user defining, in set-up mode, a specific point of interest (or SafePoint) in a base image and then aligning a specific element from a secondary image layer with that specific point. When access or authentication is subsequently required, the user has to align that element with the specific point of interest. This approach can be generalised to defining, in the set-up phase, a specific type of element in a base image which does not have a fixed location in the base image. A specific type of element from the secondary image layer is aligned with that type of element in the base image layer. For example, the base image could be random arrangement of small images of cars. The user selects a particular car in the set up phase. The secondary image layer could contain a random arrangement of small images of say motor bikes. The user aligns a specific motor bike image over his selected car image. When authentication is subsequently required, the base image of cars appears as before and the secondary image can then be called up. The user alters the grid of motor bike images until there is alignment between his pre-selected car and motor bike. Naturally, any choice of suitable images can be used for the base and secondary image layer, appropriate to the target user base.

As with the primary Clixel example, more than two layers of images can be used for enhanced security. So for example, the user may in the set-up phase have selected a specific image of a car, a motor-bike, a lady's face; then when authentication is required, an image layer with for example multiple faces is shown, overlaid with images of multiple cars; the user has to perform the correct alignment and when this occurs, a further image layer with motor bikes appears over the multiple faces; when the correct alignment is carried out, authentication is complete. The type of images do not have to appear in a set-order and the location of the different faces etc within a layer does not have to be the same each time. However, the area associated with each image in a layer has to be a sufficiently small percentage of the overall screen size to make a brute-force attack at least as challenging as in a conventional PIN or password based system. But the authentication process is far more enjoyable to the user.

The method provides a user with a fast and easy to use way to authenticate himself to the computing device. It is more secure than many conventional password and PIN based authentication systems. It can be used anywhere passwords, PINs and other simple authentication systems are used as log-ins for computers, mobile phones etc, on-line banking and transactions, ATM and Chip and PIN credit and debit card security etc. It can be used in any kind of computing device with a display, including Personal Computers, Personal Information Managers, Cellular Telephones, Automated Teller Machines, Point of Sale terminals and Security Access Systems.

Improved security is provided by making surveillance by an observer difficult to learn the key. Ease and acceptance of use is facilitated. Easy to remember graphical passwords may be utilized for access to multiple different devices, such as work/home portable phones, laptops, on-line banking, on-line transactions, and so forth.

A computing device comprises a graphical authentication interface in which the device displays a base image and a user has, in order to authenticate itself, to align a pre-selected element present in a secondary image layer overlying the base image, with a pre-selected element in the base image. The selected element in the base image may be a point of interest in a fixed location in the base image. The user may identify the point of interest in the base image by touching it or selecting it with a cursor. The point of interest may have an associated, surrounding region and the size of the surrounding region may be user-selected. Software running on the computing device may analyse a picture for suitability as a base image. The secondary image layer may include user-identifiable elements that are numbers, letters words, colours, shapes, lines, icons or any combination of these. The secondary image layer may be transparent except for an array of user-identifiable elements arranged in a pattern or grid. The pattern or grid may be regular. The whole pattern or grid may be made to move over the static base picture to enable the user to align correctly. Physics-based modelling may be used so that the speed of a touch flick varies the distance the pattern or grid moves. Shake or tip control may be used to control the way in which the pattern or grid moves. The pattern or grid may be repeated or looped in all directions so that there is no edge to it. The layout of the pattern or grid may be changed every time it appears. The change may be to the pitch of the pattern or grid, the orientation or skew of the pattern or grid, the order of the elements in the pattern or grid, the shape of the pattern or grid, or any combination of these. Two or more points of interest in the base image may be successively aligned to. The same element in the secondary image layer may be aligned to each of the multiple points of interest in the base image. The combination of hexadecimal information associated with the pre-selected elements in the base image and the secondary image layer may be used as an authentication key. An authentication key may be generated using information associated with the pre-selected element in the base image and information associated with the pre-selected element in the secondary image layer; and each item of information is held in physically remote devices. The choice of elements in the base image and the secondary image layer may be tailored to suit different users or their preferences. After one secondary image layer appears and the user successfully aligns, a further secondary image layer may appear and the user aligns a pre-selected element present in this further secondary image layer with a pre-selected element in the base image. Three or more secondary image layers may be used. The number of secondary image layers may vary depending on the level of security required. The pre-selected element in the base image may be a type of element that does not have a fixed position in the base image but that can appear anywhere in the base image. The computing device may be any of the following group: personal computers, personal information managers, cellular telephones, automated teller machines, security access systems, point of sale terminals.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

The invention claimed is:

1. An authentication method for a computing device, comprising:
   displaying a first image and a second image overlaying the first image on a display of the computing device, the first image comprising a plurality of points of interest and the second image comprising a plurality of elements,
   wherein the first image comprises a digital photograph,
   wherein the second image is partially transparent except for the plurality of elements in the second image,
   wherein the plurality of elements in the second image comprise any of the following: numbers, letters, words, colors, shapes, lines, icons, or any combination thereof;
   receiving input from an input device of the computing device;
   repositioning the second image on the display with respect to the first image in response to the received input;
   detecting when a predetermined element in the second image is geometrically aligned with a predetermined point of interest in the first image in response to the repositioning, wherein geometrical alignment occurs when the predetermined element in the second image is within a threshold distance of the predetermined point of interest in the first image; and
   authenticating a user in response to the detecting that the predetermined element in the second image is geometrically aligned with the predetermined point of interest in the first image.

2. The method of claim 1, wherein the elements in the second image are arranged in a pattern.

3. The method of claim 2, wherein the pattern comprises a grid pattern.

4. The method of claim 2, wherein the pattern is repositioned with respect to the first image while the position of the first image is fixed.

5. The method of claim 2, wherein the pattern is repeated or looped in one or more directions.

6. The method of claim 2, wherein the arrangement of the elements in the pattern is randomly generated.

7. The method of claim 6, wherein the arrangement of the elements in the pattern is randomly generated with respect to any of the following: a pitch of the pattern, an orientation or skew of the pattern, an order of the elements in the pattern, an shape of the pattern, or any combination thereof.

8. The method of claim 1, further comprising:
generating the first image from a source image by at least one of re-sizing, re-positioning, or re-arranging at least some of the plurality of points of interest of the first image.

9. The method of claim 1, wherein the user is authenticated in response to successive geometrical alignment of points in multiple elements in the second image with multiple predetermined points of interest in the first image.

10. The method of claim 1, wherein the user is authenticated in response to successive geometrical alignment of points in the same predetermined element in the second image with different predetermined points of interest in the first image.

11. The method of claim 1, wherein the user is authenticated in response to successive geometrical alignment of points in different predetermined elements in the second image with the same predetermined point of interest in the first image.

12. The method of claim 1, further comprising:
providing different levels of security, wherein a first level of security corresponds to unlocking the computing device and accessing certain functions, and a second level of security corresponds to access to an enterprise environment.

13. The method of claim 1, further comprising:
displaying a third image overlaying at least one of the first image or the second image, the third image comprising a plurality of elements;
repositioning the second image on the display with respect to the third image in response to received input
detecting when a predetermined element in the second image is geometrically aligned with a predetermined point of interest in the first image and a predetermined element in the third image in response to the repositioning;
wherein the user is authenticated in response to detecting the predetermined element in the second image is geometrically aligned with the predetermined point of interest in the first image and the predetermined element in the third image.

14. The method of claim 13,
wherein the third image is displayed in response to detecting the predetermined element in the second image is geometrically aligned with the predetermined point of interest in the first image.

15. The method of claim 1, wherein a plurality of images are used for work and home logins.

16. The method of claim 1, wherein the predetermined point of interest in the first image is a type of element that does not have a fixed position in the first image but that appears anywhere in the first image.

17. The method of claim 1, wherein the predetermined point of interest in the first image is in a fixed location in the first image.

18. The method of claim 1, wherein the authenticating allows access to the computing device.

19. The method of claim 1, wherein the authenticating allows access to a certain function of the computing device.

20. The method of claim 1, wherein the authenticating allows access to a certain area of the computing device.

21. A non-transitory computer-readable medium having computer-readable instructions stored thereon for execution by a processor of a computing device to perform, when executed by the processor, cause the computing device to:
display a first image and a second image overlaying the first image on a display of the computing device, the first image comprising a plurality of points of interest and the second image comprising a plurality of elements,
wherein the first image comprises a digital photograph,
wherein the second image is partially transparent except for the plurality of elements in the second image,
wherein the plurality of elements in the second image comprise any of the following: numbers, letters, words, colors, shapes, lines, icons, or any combination thereof;
receive input from an input device of the computing device;
reposition the second image on the display with respect to the first image in response to the received input;
detect when a predetermined element in the second image is geometrically aligned with a predetermined point of interest in the first image in response to the repositioning, wherein geometrical alignment occurs when the predetermined element in the second image is within a threshold distance of the predetermined point of interest in the first image; and
authenticate a user in response to the detecting that the predetermined element in the second image is geometrically aligned with the predetermined point of interest in the first image.

22. The non-transitory computer-readable medium of claim 21, wherein the elements in the second image are arranged in a pattern.

23. The non-transitory computer-readable medium of claim 22, wherein the pattern comprises a grid pattern.

24. The non-transitory computer-readable medium of claim 22, wherein the pattern is repositioned with respect to the first image while the position of the first image is fixed.

25. The non-transitory computer-readable medium of claim 22, wherein the pattern is repeated or looped in one or more directions.

26. The non-transitory computer-readable medium of claim 22, wherein the arrangement of the elements in the pattern is randomly generated.

27. The non-transitory computer-readable medium of claim 26, wherein the arrangement of the elements in the pattern is randomly generated with respect to any of the following: a pitch of the pattern, an orientation or skew of the pattern, an order of the elements in the pattern, an shape of the pattern, or any combination thereof.

28. The non-transitory computer-readable medium of claim 21, wherein the computer-readable instructions, which when executed by the processor, cause the computing device to:
generate the first image from a source image by at least one of re-sizing, re-positioning, or re-arranging at least some of the plurality of points of interest of the first image.

29. The non-transitory computer-readable medium of claim 21, wherein the user is authenticated in response to successive geometrical alignment of points in multiple elements in the second image with multiple predetermined points of interest in the first image.

30. The non-transitory computer-readable medium of claim 21, wherein the user is authenticated in response to successive geometrical alignment of points in the same predetermined element in the second image with different predetermined points of interest in the first image.

31. The non-transitory computer-readable medium of claim 21, wherein the user is authenticated in response to successive geometrical alignment of points in different predetermined elements in the second image with the same predetermined point of interest in the first image.

32. The non-transitory computer-readable medium of claim 21, wherein the computer-readable instructions, which when executed by the processor, cause the computing device to:
provide different levels of security, wherein a first level of security corresponds to unlocking the computing device and accessing certain functions, and a second level of security corresponds to access to an enterprise environment.

33. The non-transitory computer-readable medium of claim 21, wherein the computer-readable instructions, which when executed by the processor, cause the computing device to:
display a third image overlaying at least one of the first image or the second image, the third image comprising a plurality of elements;
receive further user input;
reposition the second image on the display with respect to the third image in response to the received further user input; and
detect when a predetermined element in the second image is geometrically aligned with a predetermined point of interest in the first image and a predetermined element in the third image in response to the repositioning;
wherein the user is authenticated in response to detecting the predetermined element in the second image is geometrically aligned with the predetermined point of interest in the first image and the predetermined element in the third image.

34. The non-transitory computer-readable medium of claim 33, wherein the third image is displayed in response to detecting the predetermined element in the second image is geometrically aligned with the predetermined point of interest in the first image.

35. The non-transitory computer-readable medium of claim 21, wherein a plurality of images are used for work and home logins.

36. The non-transitory computer-readable medium of claim 21, wherein the predetermined point of interest in the first image is a type of element that does not have a fixed position in the first image but that appears anywhere in the first image.

37. The non-transitory computer-readable medium of claim 21, wherein the predetermined point of interest in the first image is in a fixed location in the first image.

38. The non-transitory computer-readable medium of claim 21, wherein the authenticating allows access to the computing device.

39. The non-transitory computer-readable medium of claim 21, wherein the authenticating allows access to a certain function of the computing device.

40. The non-transitory computer-readable medium of claim 21, wherein the authenticating allows access to a certain area of computing device.

41. A computing device comprising:
a processor;
an input device coupled to the processor;
a display; and
a non-transitory computer readable medium coupled to the processor, the computer readable medium having computer readable instructions stored thereon to perform, when executed by the processor, cause the computing device to:
display a first image and a second image overlaying the first image on the display, the first image comprising a plurality of points of interest and the second image comprising a plurality of elements,
wherein the first image comprises a digital photograph,
wherein the second image is partially transparent except for the plurality of elements in the second image,
wherein the plurality of elements in the second image comprise any of the following: numbers, letters, words, colors, shapes, lines, icons, or any combination thereof;
receive input from an input device of the computing device;
reposition the second image on the display with respect to the first image in response to the received input;
detect when a predetermined element in the second image is geometrically aligned with a predetermined point of interest in the first image in response to the repositioning, wherein geometrical alignment occurs when the predetermined element in the second image is within a threshold distance of the predetermined point of interest in the first image; and
authenticate a user in response to the detecting that the predetermined element in the second image is geometrically aligned with the predetermined point of interest in the first image.

42. The computing device of claim 41, wherein the computing device comprises any one or more of the following: a mobile phone, a laptop, a computer, a personal information manager, a cellular telephone, an automated teller machine, a security access system, or a point of sale terminal.

43. The computing device of claim 41, wherein the elements in the second image are arranged in a pattern.

44. The computing device of claim 43, wherein the pattern comprises a grid pattern.

45. The computing device of claim 43, wherein the pattern is repositioned with respect to the first image while the position of the first image is fixed.

46. The computing device of claim 43, wherein the pattern is repeated or looped in one or more directions.

47. The computing device of claim 43, wherein the arrangement of the elements in the pattern is randomly generated.

48. The computing device of claim 47, wherein the arrangement of the elements in the pattern is randomly generated with respect to any of the following: a pitch of the pattern, an orientation or skew of the pattern, an order of the elements in the pattern, an shape of the pattern, or any combination thereof.

49. The computing device of claim 41, wherein the computer-readable instructions, which when executed by the processor, cause the computing device to:

generate the first image from a source image by at least one of re-sizing, re-positioning, or re-arranging at least some of the plurality of points of interest of the first image.

50. The computing device of claim 41, wherein the user is authenticated in response to successive geometrical alignment of points in multiple elements in the second image with multiple predetermined points of interest in the first image.

51. The computing device of claim 41, wherein the user is authenticated in response to successive geometrical alignment of points in the same predetermined element in the second image with different predetermined points of interest in the first image.

52. The computing device of claim 41, wherein the user is authenticated in response to successive geometrical alignment of points in different predetermined elements in the second image with the same predetermined point of interest in the first image.

53. The computing device of claim 41, wherein the computer-readable instructions, which when executed by the processor, cause the computing device to:
provide different levels of security, wherein a first level of security corresponds to unlocking the computing device and accessing certain functions, and a second level of security corresponds to access to an enterprise environment.

54. The computing device of claim 41, wherein the computer-readable instructions, which when executed by the processor, cause the computing device to:
display a third image overlaying at least one of the first image or the second image, the third image comprising a plurality of elements;
receive further user input;
reposition the second image on the display with respect to the third image in response to the received further user input; and
detect when a predetermined element in the second image is geometrically aligned with a predetermined point of interest in the first image and a predetermined element in the third image in response to the repositioning;
wherein the user is authenticated in response to detecting the predetermined element in the second image is geometrically aligned with the predetermined point of interest in the first image and the predetermined element in the third image.

55. The computing device of claim 54, herein the third image is displayed in response to detecting the predetermined element in the second image is geometrically aligned with the predetermined point of interest in the first image.

56. The computing device of claim 41, wherein a plurality of images are used for work and home logins.

57. The computing device of claim 41, wherein the predetermined point of interest in the first image is a type of element that does not have a fixed position in the first image but that appears anywhere in the first image.

58. The computing device of claim 41, wherein the predetermined point of interest in the first image is in a fixed location in the first image.

59. The computing device of claim 41, wherein the authenticating allows access to the computing device.

60. The computing device of claim 41, wherein the authenticating allows access to a certain function of the computing device.

61. The computing device of claim 41, wherein the authenticating allows access to a certain area of the computing device.

* * * * *